(12) United States Patent
Kumano

(10) Patent No.: US 8,655,641 B2
(45) Date of Patent: Feb. 18, 2014

(54) MACHINE TRANSLATION APPARATUS AND NON-TRANSITORY COMPUTER READABLE MEDIUM

(75) Inventor: Akira Kumano, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/310,879

(22) Filed: Dec. 5, 2011

(65) Prior Publication Data

US 2012/0136647 A1 May 31, 2012

Related U.S. Application Data

(63) Continuation of application No. PCT/JP2009/003700, filed on Aug. 4, 2009.

(51) Int. Cl.
*G06F 17/28* (2006.01)
*G06F 17/27* (2006.01)
*G06F 12/00* (2006.01)
*G06F 9/45* (2006.01)

(52) U.S. Cl.
USPC ............... 704/2; 704/3; 704/4; 704/5; 704/7; 704/9; 717/137; 707/899

(58) Field of Classification Search
USPC ................ 704/2, 3, 4, 7, 9, 277, 5; 717/137; 395/752; 707/3, 899
See application file for complete search history.

(56) References Cited

U.S. PATENT DOCUMENTS

| 4,218,760 | A | * | 8/1980 | Levy | 715/209 |
| 5,181,163 | A | * | 1/1993 | Nakajima et al. | 704/10 |
| 5,224,040 | A | * | 6/1993 | Tou | 704/2 |
| 5,535,120 | A | * | 7/1996 | Chong et al. | 704/3 |
| 5,768,603 | A | * | 6/1998 | Brown et al. | 704/9 |
| 5,805,832 | A | * | 9/1998 | Brown et al. | 711/1 |
| 6,275,789 | B1 | * | 8/2001 | Moser et al. | 704/7 |
| 7,383,542 | B2 | * | 6/2008 | Richardson et al. | 717/137 |
| 7,672,831 | B2 | * | 3/2010 | Todhunter et al. | 704/4 |

(Continued)

FOREIGN PATENT DOCUMENTS

| JP | 2002-278964 | 9/2002 |
| JP | 2006-163769 | 6/2006 |
| JP | 2008-176536 | 7/2008 |

OTHER PUBLICATIONS

International Search Report for International Application No. PCT/JP2009/003700 mailed on Jan. 19, 2010.

(Continued)

*Primary Examiner* — Edgar Guerra-Erazo
*Assistant Examiner* — Neeraj Sharma
(74) *Attorney, Agent, or Firm* — Turocy & Watson, LLP

(57) ABSTRACT

A technical term dictionary stores terms of a first language and each translated term of a second language. A translation memory stores source sentences of the first language and each target sentence of the second language. A translation unit translates a text of the first language into an output text of the second language by the technical term dictionary and the translation memory. A corresponding translation pair extraction unit extracts, from a source sentence matched with a sentence of the text and a target sentence corresponding to the source sentence stored in the translation memory, a corresponding translation pair comprising a word in the source sentence and a translated word corresponding to the word in the target sentence. An unmatch check unit checks whether the translated word does not match with a translated term corresponding to the word in the output text.

5 Claims, 16 Drawing Sheets

(56) References Cited

U.S. PATENT DOCUMENTS

| | | | |
|---|---|---|---|
| 8,296,127 B2* | 10/2012 | Marcu et al. | 704/5 |
| 2002/0065647 A1* | 5/2002 | Hatori et al. | 704/2 |
| 2002/0138250 A1* | 9/2002 | Okura et al. | 704/2 |
| 2002/0152081 A1* | 10/2002 | Kitamura et al. | 704/277 |
| 2003/0101044 A1* | 5/2003 | Krasnov | 704/4 |
| 2005/0010421 A1* | 1/2005 | Watanabe et al. | 704/277 |
| 2005/0049851 A1* | 3/2005 | Watanabe et al. | 704/2 |
| 2005/0228643 A1* | 10/2005 | Munteanu et al. | 704/9 |
| 2005/0288920 A1* | 12/2005 | Green et al. | 704/3 |
| 2007/0050182 A1* | 3/2007 | Sneddon et al. | 704/2 |
| 2007/0150443 A1* | 6/2007 | Bergholz et al. | 707/3 |
| 2008/0052061 A1* | 2/2008 | Kim et al. | 704/4 |
| 2008/0098005 A1* | 4/2008 | Goradia | 707/10 |
| 2008/0126074 A1* | 5/2008 | Whitelock et al. | 704/2 |
| 2009/0132235 A1* | 5/2009 | Liu | 704/4 |
| 2009/0157386 A1* | 6/2009 | Zhou | 704/9 |
| 2009/0177460 A1* | 7/2009 | Huang et al. | 704/2 |
| 2009/0281789 A1* | 11/2009 | Waibel et al. | 704/3 |
| 2009/0326917 A1* | 12/2009 | Hegenberger | 704/7 |
| 2010/0088085 A1* | 4/2010 | Jeon et al. | 704/7 |

OTHER PUBLICATIONS

Written Opinion for International Application No. PCT/JP2009/003700 mailed on Jan. 19, 2010.

* cited by examiner

| WORD OF TECHNICAL TERM DICTIONARY | TRANSLATED WORD | NAME OF TECHNICAL TERM DICTIONARY |
|---|---|---|
| KIKAI-HONYAKU-SHISUTEMU | machine translation system | INFORMATION |
| ONSEI-NINSHIKI-SOUCHI | speech recognition equipment | INFORMATION |
| | | |
| | | |

FIG. 2

| SOURCE SENTENCE | TRANSLATED SENTENCE | NAME OF TRANSLATION MEMORY | TRANSLATION PAIR ID |
|---|---|---|---|
| ZU-1 HA, ONSEI-NINSHIKI-SOUCHI NO NINSHIKI-SHORI NO NAGARE WO SHIMESU FUROCHATO DEARU. | Fig. 1 shows a flow chart of the recognition process in the voice recognizing unit. | PATENT | #37 |
| | | | |
| | | | |

FIG. 3

| WORD | TRANSLATED WORD | NAME OF TRANSLATION MEMORY |
|---|---|---|
| ONSEI-NINSHIKI-SOUCHI | voice recognizing unit | PATENT |
| NINSHIKI-SHORI | recognition process | PATENT |
| FUROCHATO | flow chart | PATENT |
| | | |

FIG. 4

| WORD | TRANSLATED WORD BY TECHNICAL TERM DICTIONARY | NAME OF TECHNICAL TERM DICTIONARY | TRANSLATED WORD BY TRANSLATION MEMORY | NAME OF TRANSLATION MEMORY |
|---|---|---|---|---|
| ONSEI-NINSHIKI-SOUCHI | speech recognition equipment | INFORMATION | voice recognizing unit | PATENT |
| | | | | |
| | | | | |

FIG. 5A

| WORD | TRANSLATED WORD BY TECHNICAL TERM DICTIONARY | NAME OF TECHNICAL TERM DICTIONARY | TRANSLATED WORD BY TRANSLATION MEMORY | NAME OF TRANSLATION MEMORY | TRANSLATION PAIR ID OF TRANSLATION MEMORY |
|---|---|---|---|---|---|
| ONSEI-NINSHIKI-SOUCHI | speech recognition equipment | INFORMATION | voice recognizing unit | PATENT | #37 |
| | | | | | |
| | | | | | |

FIG. 5B

| NUMBER | SOURCE SENTENCE (FIRST LANGUAGE) | TRANSLATED SENTENCE (SECOND LANGUAGE) |
|---|---|---|
| : | : | : |
| 18 | <tech id=1 name=INFORMATION> ONSEI-NINSHIKI-SOUCHI </tech>WO RIYOU-SHITE KAIWA-SURUKOTO GA DEKIRU. | You can talk by using a <tech id=1> speech recognition equipment </tech>. |
| : | : | : |
| 24 | KOUDONO<tech id=1 name=INFORMATION> ONSEI-NINSHIKI-SOUCHI</tech>HA, OHKUNO BAMEN DE HIJYOUNI YUUYOU DEARU. | A high quality <tech id=1> speech recognition equipment </tech> is very useful in many cases. |
| : | : | : |
| 46 | ZU-3 HA, <mem id=1 name=PATENT> ONSEI-NINSHIKI-SOUCHI</mem><mem id=2 name=PATENT>NINSHIKI-SHORI</mem>NO NAGARE WO SHIMESU<mem id=3 name=PATENT>FUROCHATO</mem>DEARU. | Fig. 3 shows a <mem id=3> flow chart </mem> of the <mem id=2> recognition process </mem> in the <mem id=1> voice recognizing unit </mem>. |
| : | : | : |
| 79 | ZU-6 HA, ATARASHII<mem id=1 name=PATENT>ONSEI-NINSHIKI-SOUCHI</mem>NO<mem id=2 name=PATENT> NINSHIKI-SHORI</mem>NO NAGARE WO SHIMESU <mem id=3 name=PATENT>FUROCHATO</mem>DEARU. | Fig. 6 shows a <mem id=3> flow chart </mem> of the <mem id=2> recognition process </mem> in the new <mem id=1> voice recognizing unit </mem>. |
| : | : | : |

FIG. 9

| TRANSLATION PAIR ID | SOURCE SENTENCE | TARGET SENTENCE |
|---|---|---|
|  |  |  |
| #37 | ZU-1 HA, <u>ONSEI-NINSHIKI-SOUCHI</u> NO NINSHIKI-SHORI NO NAGARE WO SHIMESU FUROCHATO DEARU. | Fig. 1 shows a flow chart of the recognition process in the speech recognition equipment. |
|  |  |  |

FIG. 19

| WORD OF TECHNICAL TERM DICTIONARY | TRANSLATED WORD |
|---|---|
| .. | .. |
| ONSEI-NINSHIKI-SOUCHI | voice recognizing unit |
|  |  |
|  |  |

FIG. 20

MACHINE TRANSLATION APPARATUS AND NON-TRANSITORY COMPUTER READABLE MEDIUM

CROSS-REFERENCE TO RELATED APPLICATION

This application is a continuation application of International Application No. PCT/JP2009/003700, filed on Aug. 4, 2009; the entire contents of which are incorporated herein by reference.

FIELD

Embodiments described herein relate generally to a machine translation apparatus and a non-transitory computer readable medium.

BACKGROUND

Recently, according to the improvement of natural language processing technique, many kinds of machine translation software to translate documents in a language into another language are developed and utilized.

A machine translation apparatus to which this software is installed is provided. As to the machine translation apparatus, translation is executed by using large scale dictionary data including a technical term dictionary. The large scale dictionary data give a suitable translation for many terms/compounds included in source sentences. Then, uniformity of translated terms in all of a translated document is guaranteed.

Furthermore, as to the machine translation apparatus, except for the technical term dictionary, a user dictionary for a user to register (the user's desired) translated terms can be prepared. The user dictionary is used for correctly translating terms not registered in a system dictionary. In this case, the system dictionary often registers technical terms and translated terms thereof.

On the other hand, in order to cover non-fluency of translated sentences by the machine translation software, a translation system using a translation memory can be utilized. The translation memory is used for translating by unit of one sentence (desirably decided by the user or the system). For example, in a thesis reported by a society or in a specification for patent application, a sentence frequently included therein and a translated sentence thereof are previously registered as a pair of a source sentence and a target sentence. By referring to the translation memory, even if a source sentence includes many technical expressions, a natural translated sentence (target sentence) corresponding to the source sentence can be output at one time. In general, machine translation software including the translation memory that previously registers tens of thousands of target sentences is sold.

However, the technical term dictionary and the user dictionary (Hereinafter, they are called "a technical term dictionary"), and the translation memory, are independently developed. Accordingly, between the technical term dictionary and the translation memory, inconsistent translated terms often exist.

For example, as shown in FIG. 22A, in a technical term dictionary of a translation apparatus for translating Japanese into English, a translated term "speech recognition equipment" corresponding to a Japanese term "ONSEI-NIN-SHIKI-SOUCHI" is registered. As a result, by using this technical term dictionary, when a term "ONSEI-NINSHIKI-SOUCHI" is included in a Japanese sentence to be translated, this term is translated into "speech recognition equipment".

Furthermore, in a translation memory of the same translation apparatus, as shown in FIG. 22B, a pair of a source sentence J1 and a target sentence E1 is registered. By using this translation memory, when a Japanese sentence to be translated matches with the source sentence J1, the target sentence E1 is output. However, as to a term "ONSEI-NIN-SHIKI-SOUCHI" in the source sentence J1, the target sentence E1 includes a translated term "voice recognizing unit".

When translation is executed by using both the technical term dictionary and the translation memory, as to a Japanese sentence matched with the source sentence J1, the translation memory is referred. As a result, as to Japanese term "ONSEI-NINSHIKI-SOUCHI", a translated term "voice recognizing unit" is output. Furthermore, in Japanese another sentence not matched with the source sentence J1, as to a term "ONSEI-NINSHIKI-SOUCHI" included therein, the technical term dictionary is referred. As a result, as to Japanese term "ONSEI-NINSHIKI-SOUCHI", the translated term "speech recognition equipment" is output. Accordingly, as to the same term "ONSEI-NINSHIKI-SOUCHI" included in one document, two translated terms "speech recognition equipment" and "voice recognizing unit" are output. As a result, uniformity of translated terms as a characteristic of the machine translation apparatus is lost.

BRIEF DESCRIPTION OF THE DRAWINGS

FIG. 2 is one example of a translated word table according to the first embodiment.

FIG. 3 is one example of a translated sentence table according to the first embodiment.

FIG. 4 is one example of a corresponding translation pair table according to the first embodiment.

FIGS. 5A and 5B are examples of an unmatched translation pair table according to the first embodiment.

FIG. 9 is one example of source/translated sentence data according to the second embodiment.

FIG. 19 is one example of the translation memory after editing according to the fourth embodiment.

FIG. 20 is one example of the technical term dictionary after editing according to the fourth embodiment.

DETAILED DESCRIPTION

Figure 1:
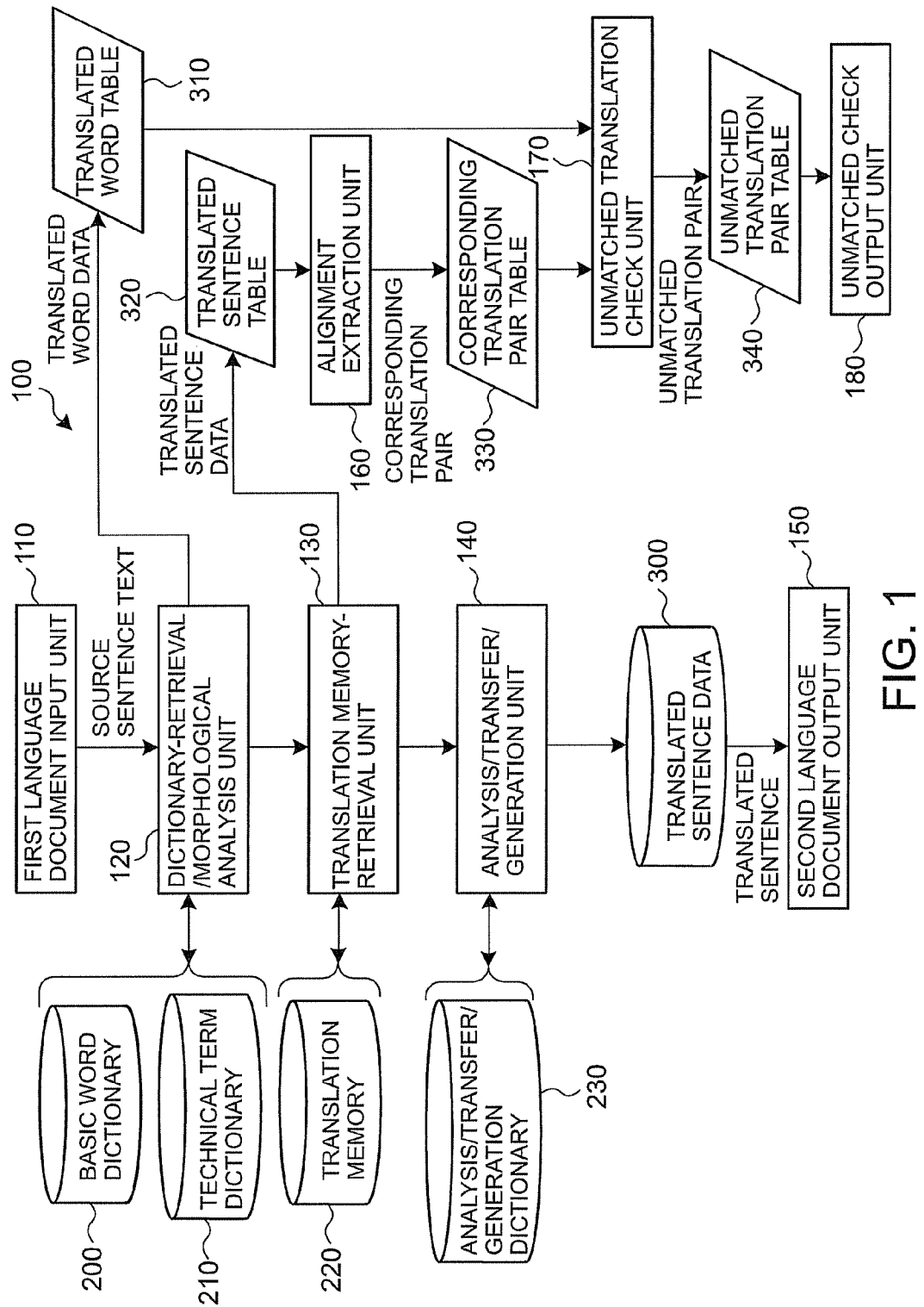
FIG. 1 is a block diagram of a machine translation apparatus according to a first embodiment.

According to one embodiment, a machine translation apparatus includes a technical term dictionary, a translation memory, a translation unit, a corresponding translation pair extraction unit, and an unmatch check unit. The technical term dictionary is configured to store terms of a first language and a translated term of a second language corresponding to each term. The translation memory is configured to store source sentences of the first language and a target sentence of the second language corresponding to each source sentence. The translation unit is configured to translate an input text of the first language into an output text of the second language by comparing each sentence of the input text with the technical term dictionary and the translation memory. The corresponding translation pair extraction unit is configured to extract, from a source sentence matched with a sentence of the input text and a target sentence corresponding to the source sentence stored in the translation memory, a corresponding translation pair comprising a word in the source sentence and a translated word corresponding to the word in the target sentence. The unmatch check unit is configured to check whether the translated word does not match with a translated term corresponding to a term matched with the word in the output text.

Hereinafter, further embodiments will be described with reference to the accompanying drawings. In the drawings, same sign represents the same or similar part.

The First Embodiment

As to a machine translation apparatus according to the first embodiment, a translated word is acquired from a target sentence extracted by referring to a translation memory, and a corresponding translation pair (comprising the translated word and a source word thereof) is created. Then, as to a translated term of a term (matched with the source word) stored in a technical term dictionary (first referred with a basic word dictionary for translation), it is checked whether the translated term matches with the translated word, and this check result is output. Moreover, as a machine to install a translation program of the first embodiment may be any of a personal computer, a desktop computer, PDA, and so on. (Hereinafter, a term and a translated term thereof stored in the technical term dictionary are called "a word and a translated word thereof".)

In following explanation, a source sentence to be translated is a first language and a target language translated is a second language. In this case, an example that the first language is Japanese and the second language is English is explained. However, combination of the first language and the second language is not limited to this example. The first and second languages may be any combination of French, Germany, Italian, Chinese, Korean, and so on.

FIG. 1 is a block diagram of a machine translation apparatus according to the first embodiment. The machine translation apparatus includes a first language document input unit 110, a dictionary-retrieval/morphological analysis unit 120, a translation memory-retrieval unit 130, an analysis/transfer/generation unit 140, and a second language document output unit 150. By these units, translation processing is executed. Furthermore, in the first embodiment, an alignment extraction unit 160, an unmatched translation check unit 170, and an unmatch check output unit 180, are included. By above-mentioned units, unmatched translation pair between the technical term dictionary and the translation memory (both used for translation) is checked, and this check result is output.

Furthermore, in the first embodiment, as dictionaries referred at translation processing time, a basic word dictionary 200, a technical term dictionary 210, a translation memory 220, and an analysis/transfer/generation dictionary 230, are included. Furthermore, as a storage unit to store various work data, a translated sentence data 300 to store translated sentences of the second language (generated by the analysis/transfer/generation unit 140). Furthermore, a translated word table 310 to store translated word data acquired by comparing an input source sentence with the technical term dictionary 210 is included.

Furthermore, a translated sentence table 320 to store translated sentence data acquired by comparing the input source sentence with the translation memory 220 is included. Furthermore, a corresponding translation pair table 330 to store corresponding translation pairs created from the translated sentence data by the alignment extraction unit 160 is included. Furthermore, an unmatched translation pair table 340 to store unmatched translation pairs created by the unmatched translation check unit 170 is included. These tables are assigned to a work region of a main storage device of the machine translation apparatus. Alternatively, these tables may be assigned to a work region of an external memory of the machine translation apparatus.

The first language document input unit 110 is a device to input a source sentence text of the first language to be translated. For example, the first language document input unit 110 is composed by a general input device of a computer, such as a keyboard, an OCR, an image scanner, and a memory to store source sentences.

As to each word of a source sentence text from the first language document input unit 110, the dictionary-retrieval/morphological analysis unit 120 retrieves the same word from the basic word dictionary 200 and the technical term dictionary 210, and executes morphological analysis processing thereof. This method for retrieving dictionary and morphologically analyzing may be realized by a conventional technique. The dictionary-retrieval/morphological analysis unit 120 outputs a morphological analysis result to the analysis/transfer/generation unit 140. Furthermore, as to each word of the source sentence text, the dictionary-retrieval/morphological analysis unit 120 extracts a pair of the same word and a translated word thereof from the technical term dictionary 210, and stores the pair (It is called "translated word data") into the translated word table 310.

As to each sentence of the source sentence text from the first language document input unit 110, the translation memory-retrieval unit 130 retrieves the same sentence from the translation memory 220. This method for retrieving may be realized by a conventional technique. If the translation memory 220 stores a source sentence matched with the sentence of the source sentence text, the translation memory-retrieval unit 130 outputs a target sentence thereof to the analysis/transfer/generation unit 140. Furthermore, the translation memory-retrieval unit 130 stores a pair of the source sentence and the target sentence thereof (It is called "translated sentence data") into the translated sentence table 320.

In response to output data from the dictionary-retrieval/morphological analysis unit 120 and the translation memory-retrieval unit 130, the analysis/transfer/generation unit 140 executes analysis processing of a first language sentence, transfer processing from the first language to the second language, and generation processing of a second language sentence. Based on an output result from the translation memory-retrieval unit 130, the analysis processing and the transfer processing may be omitted. In any case, the analysis processing, the transfer processing and the generation processing may be realized by a conventional technique. The analysis/transfer/generation unit 140 stores a translated sentence of the second language into the translated sentence data 300.

The second language document output unit 150 reads the translated sentence from the translated sentence data 300, and outputs it to a user. For example, the second language document output unit 150 is composed by a general output device such as a CRT, a liquid crystal display, or a printer.

Next, the alignment extraction unit 160 analyzes the pair of the source sentence and the translated sentence stored in translated sentence table 320, and extracts a correspondence relationship between each word of the source sentence and a translated word of the translated sentence. This method for extracting the correspondence relationship may be realized by a conventional technique. The alignment extraction unit 160 stores a pair of each word and the translated word thereof (It is called "a corresponding translation pair") into the corresponding translation pair table 330.

The unmatched translation check unit 170 compares each translated word stored in the translated word table 310 with the corresponding translation pair stored in the corresponding translation pair table 330. As to the same word (in the first language), if a translated word (in the second language) stored in the translated word table matches with a translated word (in the second language) of the corresponding translation pair stored in the corresponding translation pair table 330, the unmatched translation check unit 170 stores this comparison result (It is called "an unmatched translation pair") into the unmatched translation pair table 340.

The unmatch check output unit 180 outputs the unmatched translation pair stored in the unmatched translation pair table 340. For example, the unmatched check output unit 180 is composed by a general output device such as a CRT, a liquid crystal display, or a printer. Naturally, the unmatch check output unit 180 and the second language document output unit 150 may be one unit.

FIG. 2 is one example of translated word data stored in the translated word table 310. For example, the translated word data is composed by "word of technical term dictionary, translated word, name of technical term dictionary". In this case, "word of technical term dictionary" is a word or a term (of the source sentence text in the first language) matched with the technical term dictionary 210, "translated word" is a translated word (in the second language) corresponding to the word or the term (in the first language) acquired from the technical term dictionary 210, and "name of technical term dictionary" is a name of the technical term dictionary 210 from which the translated word is acquired.

In FIG. 2, as to a word "KIKAI-HONYAKU-SHISUTEMU" (in Japanese) stored in the technical term dictionary 210, the translated word "machine translation system" and the name "information" of the technical term dictionary are stored. In the same way, as to a word "ONSEI-NINSHIKI-SOUCHI" (in Japanese), the translated word "speech recognition equipment" and the name "information" of the technical term dictionary are shown.

FIG. 3 is one example of translated sentence data stored in the translated sentence table 320. For example, the translated sentence data is composed by "source sentence, translated sentence, name of translation memory, translation pair ID". In this case, "source sentence" is a sentence (of the source sentence text in Japanese) matched with the translation memory 220, "translated sentence" is a target sentence (in English) corresponding to the source sentence acquired from the translation memory 220, "name of translation memory" is a name of the translation memory 220 from which the translated sentence is acquired, and "translation pair ID" is a number (not-overlapped) assigned to the translated sentence. If this number is not utilized, "translation pair ID" is omitted.

In FIG. 3, as to a source sentence "ZU-1 HA, ONSEI-NINSHIKI-SOUCHI NO NINSHIKI-SHORI NO NAGARE WO SHIMESU FUROCHATO DEARU." (in Japanese), a translated sentence "FIG. 1 shows a flow chart of the recognition process in the voice recognizing unit." is shown. In this case, "patent" is stored as a name of the translation memory, and "#37" is stored as the translation pair ID.

FIG. 4 is one example of corresponding translation pair data stored in the corresponding translation pair table 330. For example, the corresponding translation pair data is composed by "word, translated word, name of translation memory". In this case, "word" is a word extracted from "source sentence" of the translated sentence table 320 by the alignment extraction unit 160, and "translated word" is a translated word extracted from "translated sentence" of the translated sentence table 320 by the alignment extraction unit 160. Furthermore, "name of translation memory" is a name of the translation memory 220 (corresponding to "translated sentence" from which the translated word is extracted) stored in the translated sentence table 320. The corresponding translation pair generated by the alignment extraction unit 160 is stored into the corresponding translation pair table 330.

In FIG. 4, as the corresponding translation pair extracted from "source sentence" and "translated sentence" of the translated sentence table 320 shown in FIG. 3, a word "ONSEI-NINSHIKI-SOUCHI" and the translated word "voice recognizing unit", a word "NINSHIKI-SHORI" and the translated word "recognition process", and a word "FUROCHATO" and the translated word "flow chart", are shown. As "name of translation memory", "patent" is equally stored for these three words.

FIGS. 5A and 5B are examples of unmatched translation pair data stored in the unmatched translation pair table 340. For example, as shown in FIGS. 5A and 5B, the unmatched translation pair data is composed by "word, translated word by technical term dictionary, name of technical term dictionary, translated word by translation memory, name of translation memory". In this case, "word" is a word commonly included in the translated word table 310 (FIG. 2) and the corresponding translation pair table 330 (FIG. 4). In FIGS. 5A and 5B, "ONSEI-NINSHIKI-SOUCHI" is the word commonly included.

Furthermore, "translated word by technical term dictionary" is a translated word (corresponding to "word") acquired from the translated word table 310, and "name of technical term dictionary" is a name of the technical term dictionary (corresponding to the translated word acquired) stored in the translated word table 310. Furthermore, "translated word by translation memory" is a translated word (corresponding to "word") acquired from the corresponding translation pair table 330, and "name of translation memory" is a name of the translation memory (corresponding to the translated word acquired) stored in the corresponding translation pair table 330. Briefly, "name of translation memory" is a name of the translation memory 220 from which the corresponding translation pair is extracted.

In FIG. 5A, in correspondence with the word "ONSEI-NINSHIKI-SOUCHI", the translated word "speech recognition equipment" acquired from the technical term dictionary 210, the name "information" of the technical term dictionary 210, the translated word "voice recognizing unit" of corresponding translation pair acquired from the translation memory 220, and the name "patent" of the translation memory 220, are shown.

In FIG. 5B, in addition to FIG. 5A, "translation pair ID of translation memory" is further included. This "translation pair ID of translation memory" is a translation pair ID (not overlapped) assigned to the source sentence (matched with an input source sentence) stored in the translation memory 220. In FIG. 5B, the same ID "#37" as the translation pair ID of FIG. 3 is set.

Figure 6:
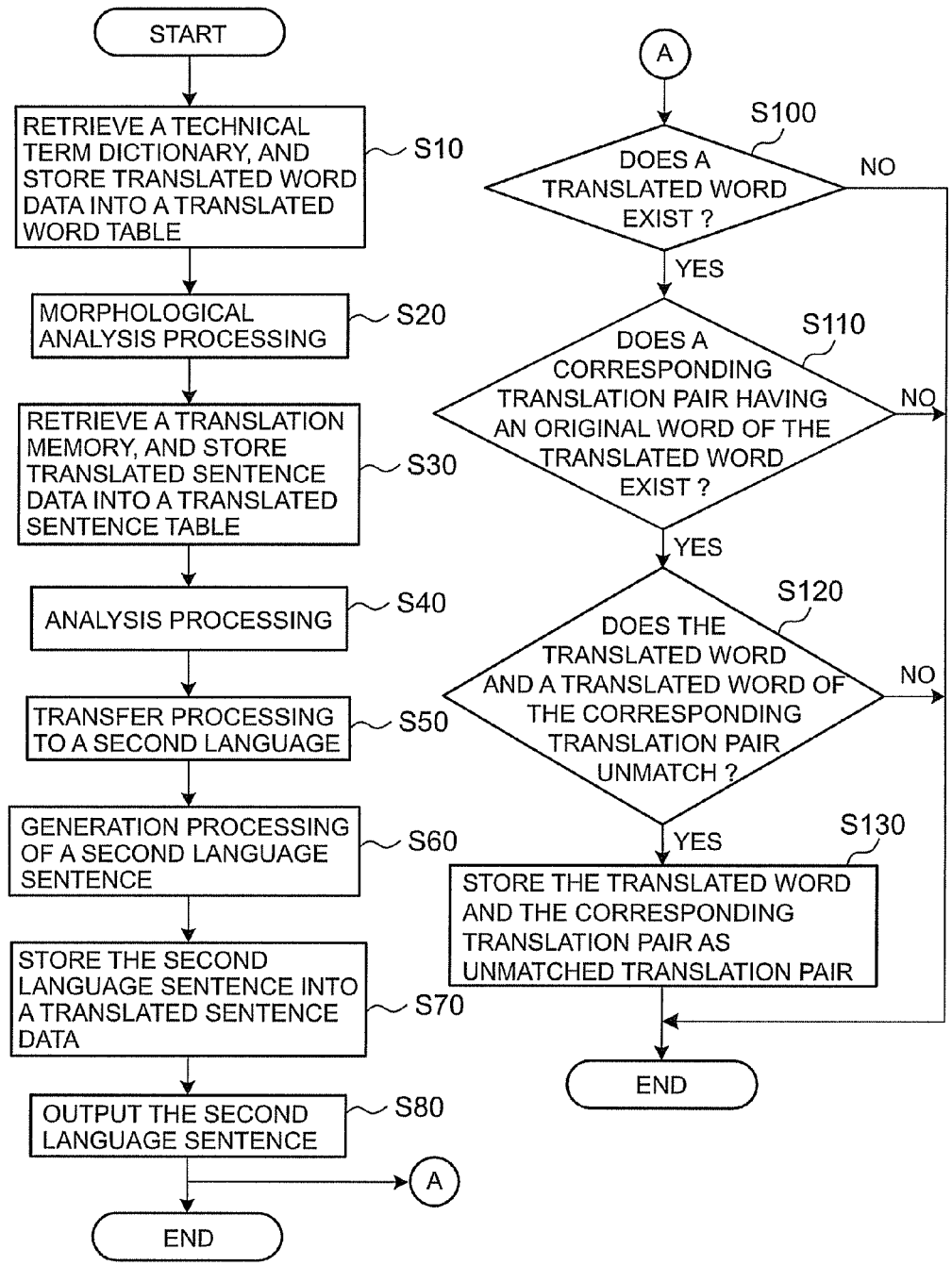
FIG. 6 is a flow chart of processing of the machine translation apparatus according to the first embodiment.

Next, operation of the machine translation apparatus according to the first embodiment is explained. FIG. 6 is a flow chart of processing of the machine translation apparatus according to the first embodiment. In FIG. 5, the case that a translation program to execute following operation is previously installed into the machine translation apparatus is explained.

In response to a source sentence text from the first language document input unit 110, the dictionary-retrieval/morphological analysis unit 120 retrieves the basic word dictionary 200 and the technical term dictionary 210 (S10), and executes morphological analysis processing (S20). Then, the dictionary-retrieval/morphological analysis unit 120 outputs a morphological analysis result to the analysis/transfer/generation unit 140. At 510, as to each word included in the source sentence text, the dictionary-retrieval/morphological analysis unit 120 creates translated word data (a pair of a word matched with the technical term dictionary 210 and a translated word of the word) shown in FIG. 2, and the translated word data into the translated word table.

Furthermore, in response to the source sentence text from the first language document input unit 110, the translation memory-retrieval unit 130 retrieves the translation memory 220 (S30). Then, each source sentence included in the source sentence text, the translation memory-retrieval unit 130 creates translated sentence data (a source sentence matched with the translation memory 220 and a target sentence thereof stored in the translation memory 220), and stores the translated sentence data into the translated sentence table 320. As to a source sentence unmatched with the translation memory 220, the translation memory-retrieval unit 130 outputs nothing.

In response to output data from the dictionary-retrieval/morphological analysis unit 120 and the translation memory-retrieval unit 130, the analysis/transfer/generation unit 140 executes analysis processing of a first language sentence (S40), transfer processing from the first language to the second language (S50), and generation processing of a second language sentence (S60). The analysis/transfer/generation unit 140 stores translated sentences (in the second language) into the translated sentence data 300 (S70).

The second language document output unit 150 reads the translated sentence from the translated sentence data 300, and outputs it to a user (S80).

After above-mentioned processing is completed, the unmatched translation check unit 170 examines each translated word stored in the translated word table 310 (S100). If the translated word table 310 stores no translated words, processing is completed.

Furthermore, the alignment extraction unit 160 analyzes a pair of a source sentence (matched with any source sentence of the translation memory 320) and a translated sentence thereof stored in translated sentence table 320, and extracts a correspondence relationship between each word of the source sentence and a translated word of the translated sentence (S110). If the correspondence relationship is not extracted, processing is completed. The alignment extraction unit 160 stores a pair of each word and the translated word thereof as the corresponding translation pair (FIG. 4) into the corresponding translation pair table 330.

Next, the unmatched translation check unit 170 compares each translated word stored in the translated word table 310 with the corresponding translation pair stored in the corresponding translation pair table 330. As to the same word of the first language, the unmatched translation check unit 170 checks whether a translated word of the second language (stored in the translated word table) matches with a translated word of the corresponding translation pair (stored in the corresponding translation pair table 330). If the translated word of the second language does not match with the translated word of the corresponding translation pair, the unmatched translation check unit 170 creates an unmatched translation pair (two translated words unmatched), and stores the unmatched translation pair into the unmatched translation pair table 340 (S120). If the unmatched translation pair is not created, processing is completed. Then, the unmatch check output unit 180 outputs the unmatched translation pair (stored in the unmatched translation pair table 340) to a user (S130).

Figure 7A:
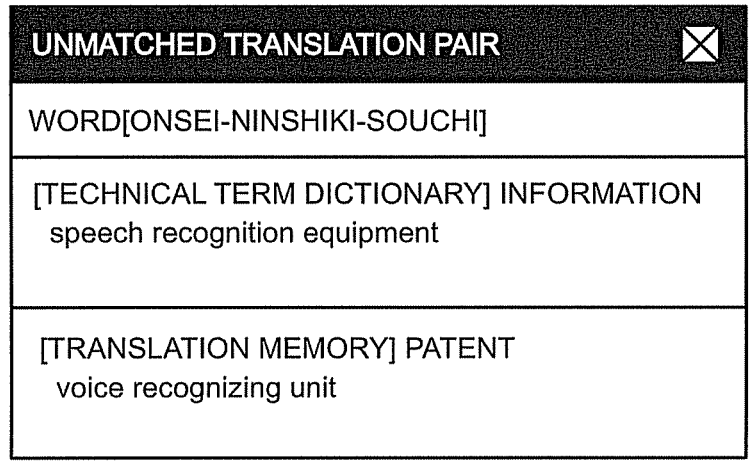
FIGS. 7A and 7B are output examples of unmatch check result according to the first embodiment.
Figure 7B:
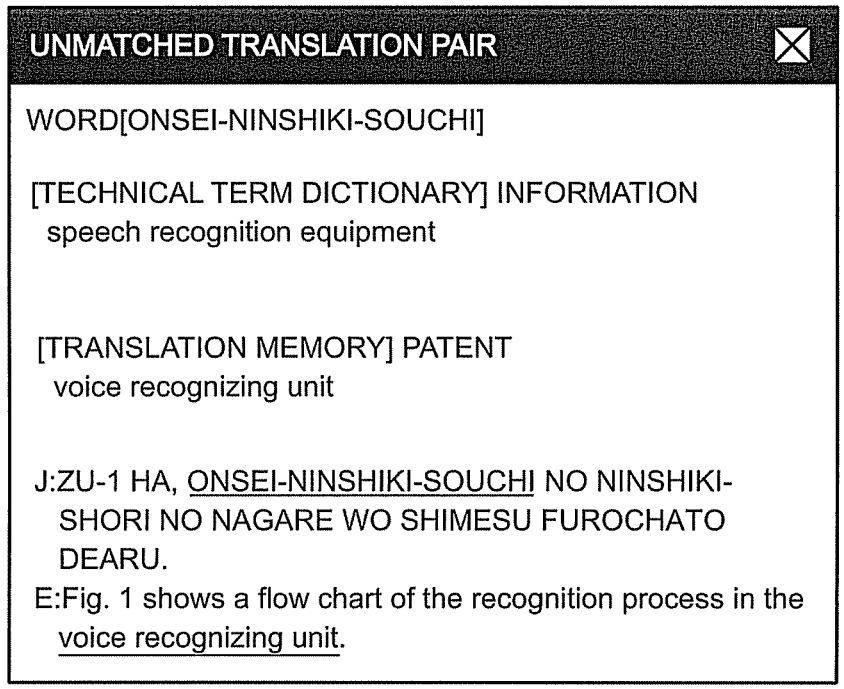

FIGS. 7A and 7B are output examples of the unmatched translation pair by the unmatch check output unit 180. Briefly, based on the unmatched translation pair (FIGS. 5A and 5B), as to a word "ONSEI-NINSHIKI-SOUCHI", "speech recognition equipment" acquired by the technical term dictionary is output, and "voice recognizing unit" acquired by the translation memory 220 is output.

In FIG. 7A, a word "ONSEI-NINSHIKI-SOUCHI", a translated word "speech recognition equipment" by the technical term dictionary, a name "information" of the technical term dictionary, a translated word "voice recognizing unit" by the translation memory, and a name "patent" of the translation memory (shown in FIG. 5A), are displayed in order. As a result, the user can recognize that unmatched translated words are included in the translated sentences output from the second language document output unit 150.

In FIG. 7B, by using "translation pair ID of translation memory" shown in FIG. 5B, "source sentence" and "translated sentence" are extracted from the translated sentence data of FIG. 3, and respectively displayed at the lower part.

In this way, in the machine translation apparatus and the translation program according to the first embodiment, word information of unmatched translated words acquired by the technical term dictionary and the translation memory (used for translation) can be easily detected. Based on this word information, the user can change a translated word of the technical term dictionary, or edit a target sentence of the translation memory, in order to retranslate. As a result, translated sentences having matched translated words can be acquired.

The Second Embodiment

Figure 8:
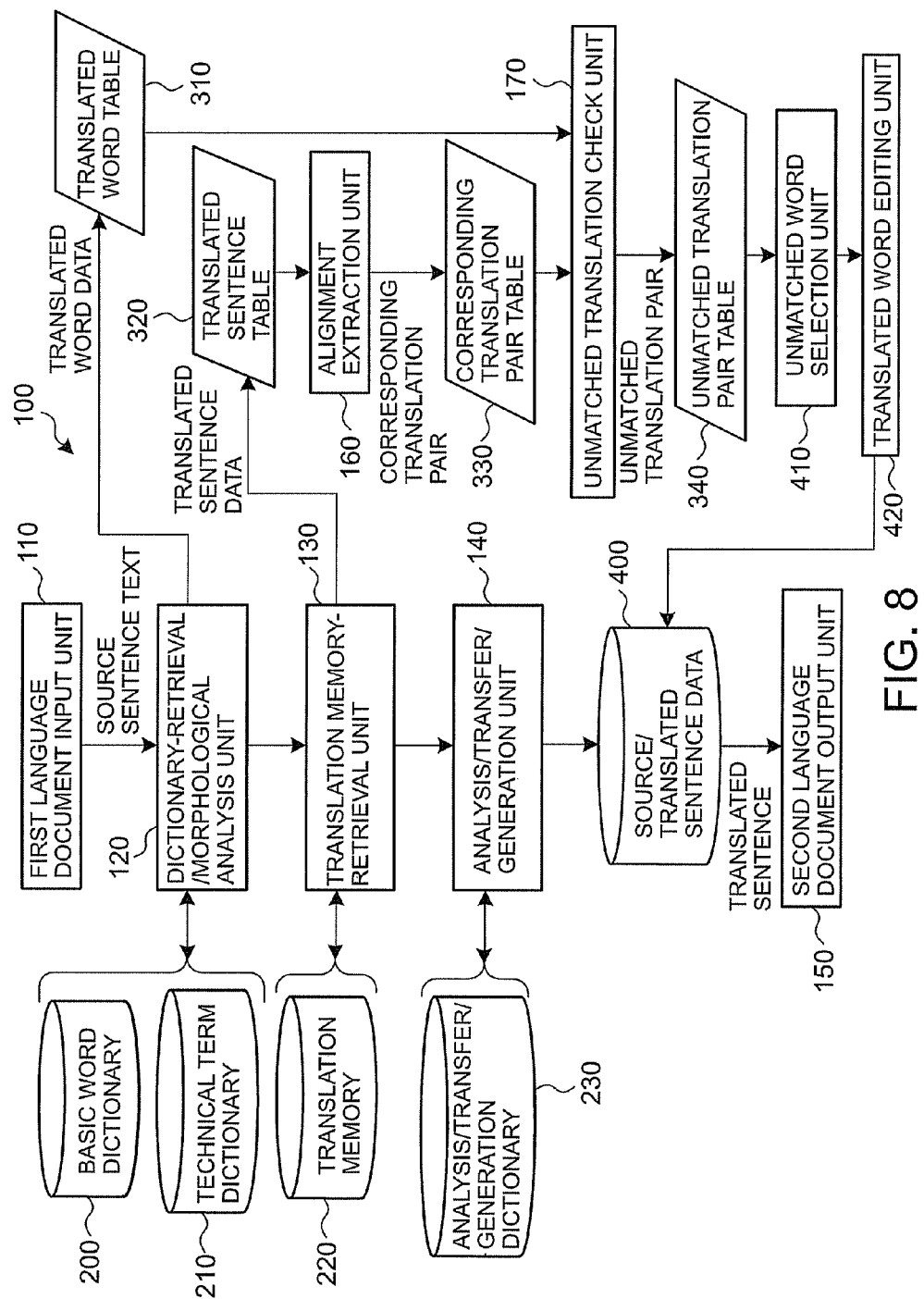
FIG. 8 is a block diagram of the machine translation apparatus according to a second embodiment.

FIG. 8 is a block diagram of a machine translation apparatus according to the second embodiment. The machine translation apparatus includes the first language document input unit 110, the dictionary-retrieval/morphological analysis unit 120, the translation memory-retrieval unit 130, the analysis/ transfer/generation unit 140, the second language document output unit 150, the alignment extraction unit 160, the unmatched translation check unit 170, a source/translated sentence data 400, an unmatched word selection unit 410, and a translated word editing unit 420. Each of the first language document input unit 110~the unmatched translation check unit 170 is same as the corresponding unit in FIG. 1.

In addition to a function of the umatch check output unit 180, the unmatched word selection unit 410 can make a user select any of different translated words as the unmatched translation pair. For example, the unmatched word selection unit 410 is composed by a general output device (such as a CRT, a liquid crystal display, a printer) and a general input device (a keyboard, a mouse). Naturally, the unmatched word selection unit 410 and the second language document output unit 150 may be one unit.

Furthermore, the translated word editing unit 420 edits a translated sentence stored in the source/translated sentence data 400, based on the user's selection result by the unmatched word selection unit 410. Naturally, functions of the unmatched word selection unit 410, the second language document output unit 150 and the translated word editing unit 420, may be realized by one device.

In addition to the original sentence text (in the first language) and the translated sentences (in the second language) thereof, the source/translated sentence data 400 stores all words (marched with the technical term dictionary 210) and translated word data thereof (acquired by the technical term dictionary 210), and corresponding translation pairs acquired by the translation memory 220.

FIG. 9 is one example of the source/translated sentence data 400 according to the second embodiment. For example, the source/translated sentence data 400 is composed by "number, source sentence (first language), translated sentence (second language)".

In FIG. 9, "source sentence" is a source sentence of the first language translated by using the technical term dictionary 210 and the translation memory 220. As to a word matched with the technical term dictionary 210, "<tech id=n name=name of dictionary>" is assigned. Furthermore, as to a word extracted from the translation memory 220, "<mem id=m name=name of dictionary>" is assigned. In this case, "n, m" is numbers to identify each word in the sentence. Name of dictionary following from "name" is a name of the technical term dictionary or a name of the translation memory. In FIG. 9, two source sentences of numbers 46 and 79 respectively have a part different from "SOURCE SENTENCE" of the translation memory 220 shown in FIG. 3. Because, when each source sentence is compared with the translation memory 220, a part of the source sentence different from "SOURCE SENTENCE" of the translation memory can be replaced. Accordingly, the translated sentence having a translated part corresponding to the different part can be output.

Furthermore, in FIG. 9, "translated sentence" is a translated sentence of the second language corresponding to the source sentence. As to words having "<tech id=n name=name of dictionary>" or "<mem id=m name=name of dictionary>" in the source sentence, translated words corresponding to the words have the same information in a translated sentence. In the translated sentence, "name of the technical term dictionary" and "name of the translation memory" are common to the source sentence. Accordingly, these names can be omitted.

Figure 10:
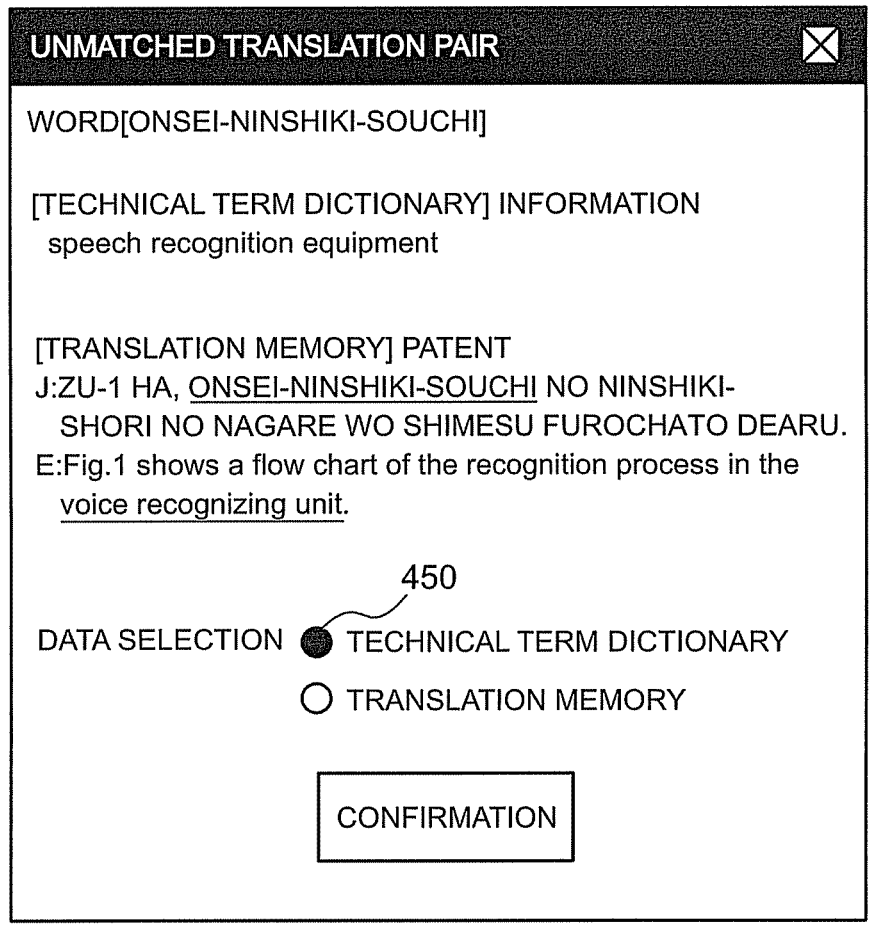
FIG. 10 is output example of unmatched translation pair according to the second embodiment.

FIG. 10 is an output example of the unmatched word selection unit 410 according to the second embodiment. This example is displayed based on the unmatched translation pair shown in FIG. 5A. Briefly, in FIG. 10, a button for a user to select any dictionary is prepared on a display of the unmatched translation pair shown in FIG. 7B. As a result, as a translated word corresponding to a source word displayed, the user can select which dictionary (the technical term dictionary 210 or the translation memory 220) is used for generating the translated word. For example, when the user indicates the technical term dictionary by a selection button 450 and pushes a button "confirmation", this section result with the word "ONSEI-NINSHIKI-SOUCHI" is sent to the translated word editing unit 420.

The translated word editing unit 420 retrieves all data matched with the word "ONSEI-NINSHIKI-SOUCHI" from the source/translated sentence data 400. If a translated word in all data is different from a translated word of the dictionary selected, the translated word in all data is replaced with the translated word of the dictionary selected.

For example, in FIG. 10, when the user selects the technical term dictionary 210, two translated sentences of number 18 and 24 (shown in FIG. 9) need not be edited. On the other hand, as to two translated sentences of number 46 and 79, the translated word editing unit 420 replaces "voice recognizing unit" with "speech recognition equipment".

Conversely, in FIG. 10, when the user selects the translation memory 220, two translated sentences of number 46 and 79 (shown in FIG. 9) need not be edited. On the other hand, as to two translated sentences of number 18 and 24, the translated word editing unit 420 replaces "speech recognition equipment" with "voice recognizing unit".

In this way, in the second embodiment, the translated sentence can be edited by using a translated word of the dictionary (the technical term dictionary or the translation memory) selected by the user via the translated word editing unit 420.

Next, FIGS. 11~16 shows an operation screen to edit and confirm translated sentences by selecting the dictionary (in FIG. 10).

Figure 11:
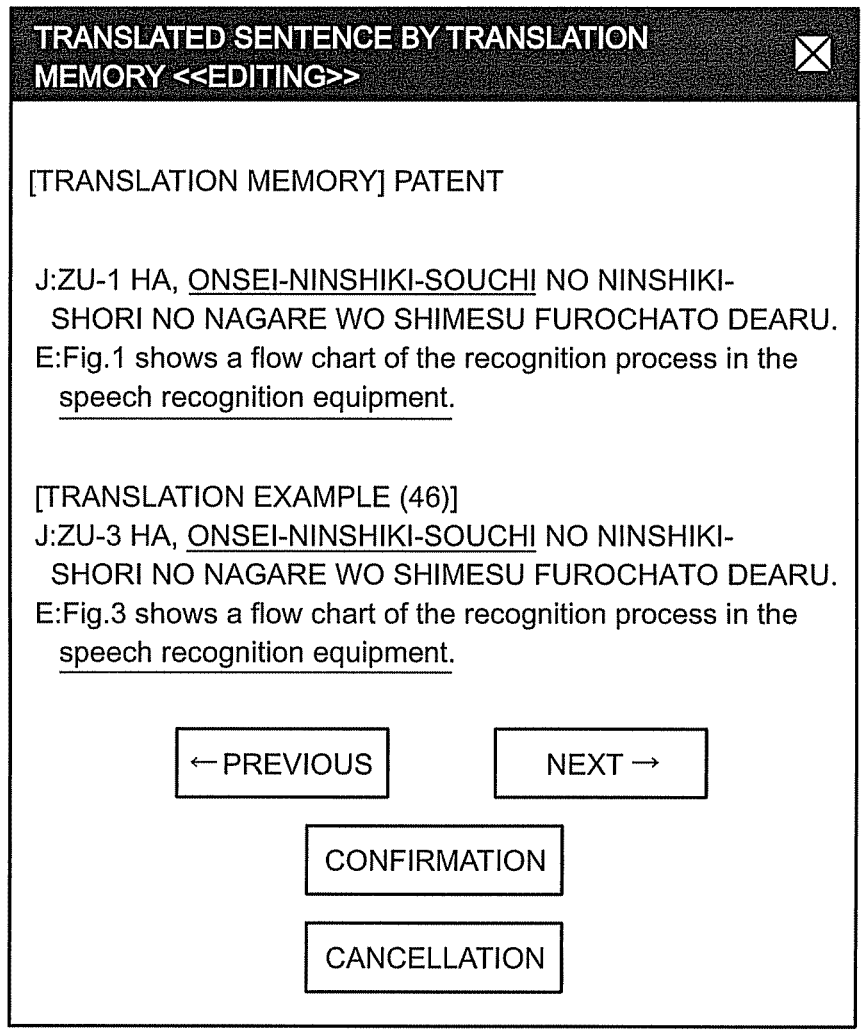
FIG. 11 is one example of edited target sentences of a translation memory according to the second embodiment.

FIG. 11 is a display example to confirm editing of translated sentences (translated by using the translation memory 220) when the user selects the technical term dictionary 210 in FIG. 10. Briefly, on a screen of the translated word editing unit 420, a source sentence (matched with an input source sentence to be translated) and a target sentence thereof stored in the translated memory 220 are displayed, and a translated sentence (firstly acquired by using the target sentence stored in the translation memory 220) of the input source sentence are displayed. In FIG. 11, the source sentence of number 46 and the translated sentence thereof are displayed. In this case, a translated word corresponding to the source word "ONSEI-NINSHIKI-SOUCHI" is replaced with a translated word/ phrase (word or phrase) "speech recognition equipment" (translated by using the technical term dictionary 210). By adding an underline to the source word and the translated word edited, a screen for the user to easily confirm the editing is presented. Except for the underline, display such as coloring or hatching may be used. Then, when the user indicates a button [NEXT→], a next translated sentence (secondly acquired by using the target sentence stored in the translation memory 220) corresponding to the same source sentence is displayed.

Figure 12:
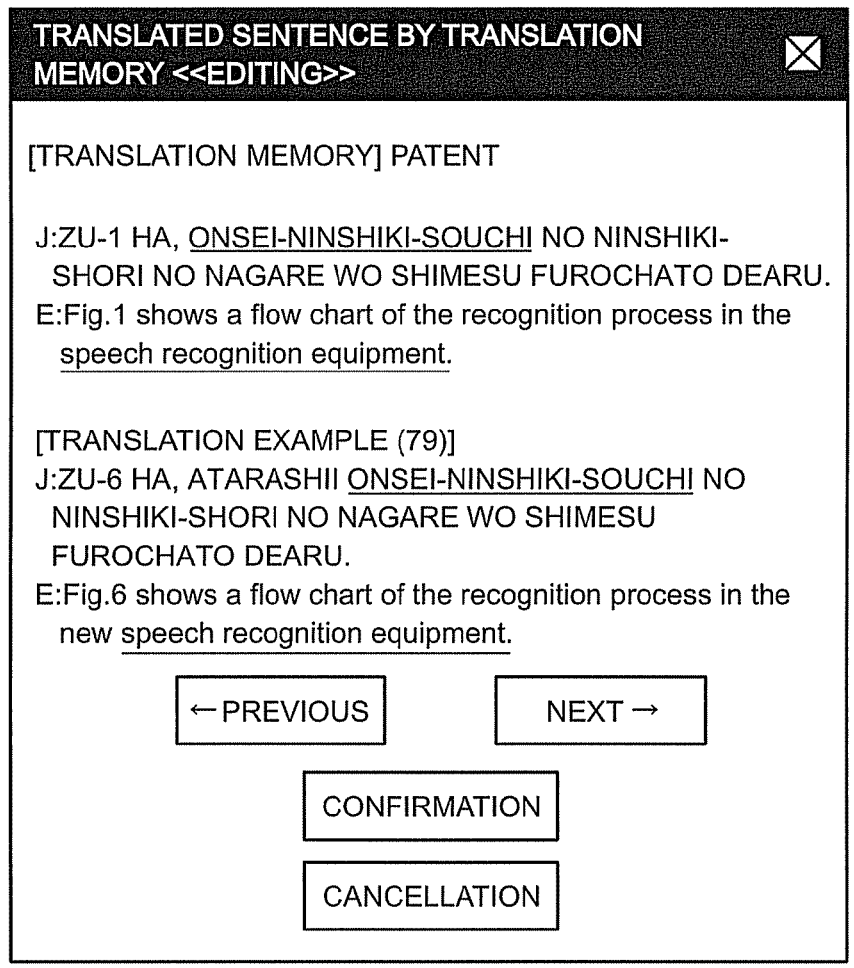
FIG. 12 is another example of edited target sentences of the translation memory according to the second embodiment.

FIG. 12 is a display example of the result that the button [NEXT→] is indicated in FIG. 11. In FIG. 12, a source sentence of number 79 and a translated sentence thereof are displayed. In the same way, a translated word corresponding to the source word "ONSEI-NINSHIKI-SOUCHI" is replaced with a translated word/phrase "speech recognition equipment" (translated by using the technical term dictionary 210). Then, when the user indicates a button [←PREVIOUS], a previous translated sentence (previously acquired by using the target sentence stored in the translation memory 220) corresponding to the same source sentence is displayed. In this case, the display screen is returned to FIG. 11.

Figure 13:
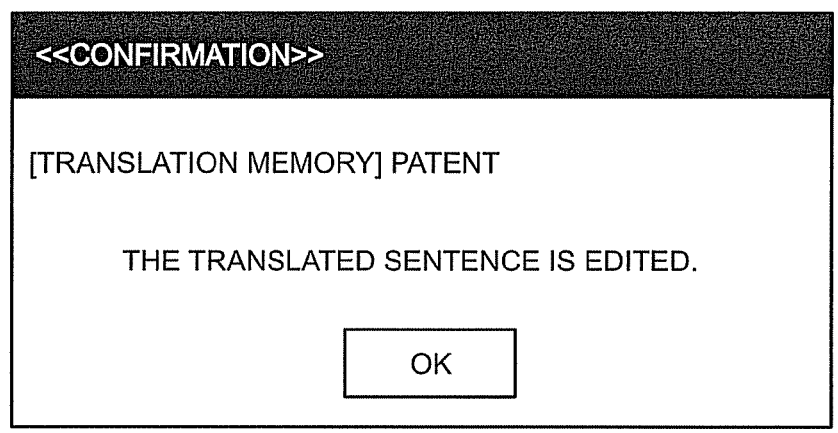
FIG. 13 is one example to confirm the edited translated sentences according to the second embodiment.

When a button [CONFIRMATION] is indicated on a display screen of FIG. 11 or FIG. 12, the translated sentence is edited. Then, a screen to confirm the translated sentence edited is displayed as shown in FIG. 13, and returned to the original one of FIG. 10. In this case, the software for editing is designed to perform batch editing by the button [CONFIRMATION]. In case of the batch editing, all translated sentences as an editing target are edited. Furthermore, when a button [CANCELLATION] is indicated on the display screen of FIG. 11 or FIG. 12, editing of the translated sentence is cancelled, and the screen is returned to the original one of FIG. 10.

Figure 14:
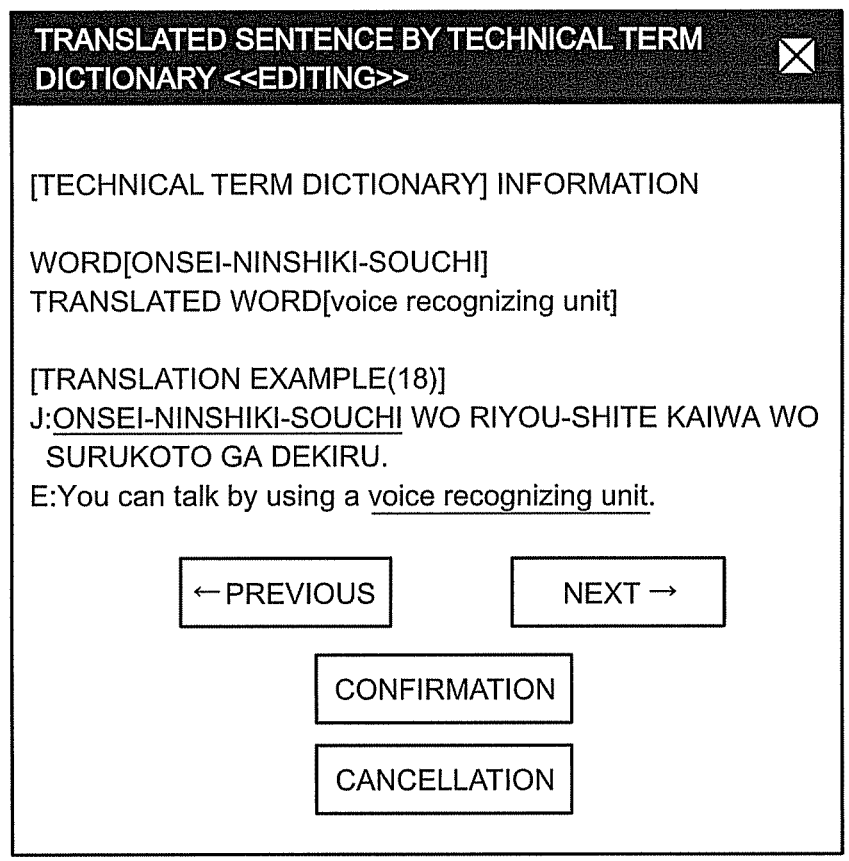
FIG. 14 is one example of an edited translated word of a technical term dictionary according to the second embodiment.

FIG. 14 is a display example to confirm editing of translated sentences (translated by using the technical term dictionary 210) when the user selects the translation memory 220 in FIG. 10. Briefly, on a screen of the translated word editing unit 420, a source word and a translated word thereof (acquired from the technical term dictionary 210) are displayed, and a translated sentence (firstly acquired by using the translated word of the technical term dictionary 210) is displayed. In FIG. 14, the source sentence of number 18 and the translated sentence thereof are displayed. In this case, a translated word corresponding to the source word "ONSEI-NINSHIKI-SOUCHI" is replaced with a translated word/phrase "voice recognizing unit" (acquired from the translation memory 220). By adding an underline to the source word and the translated word edited, a screen for the user to easily confirm the editing is presented. Then, when the user indicates a button [NEXT→], a next translated sentence (secondly acquired by using the same translated word of the technical term dictionary 210) is displayed.

Figure 15:
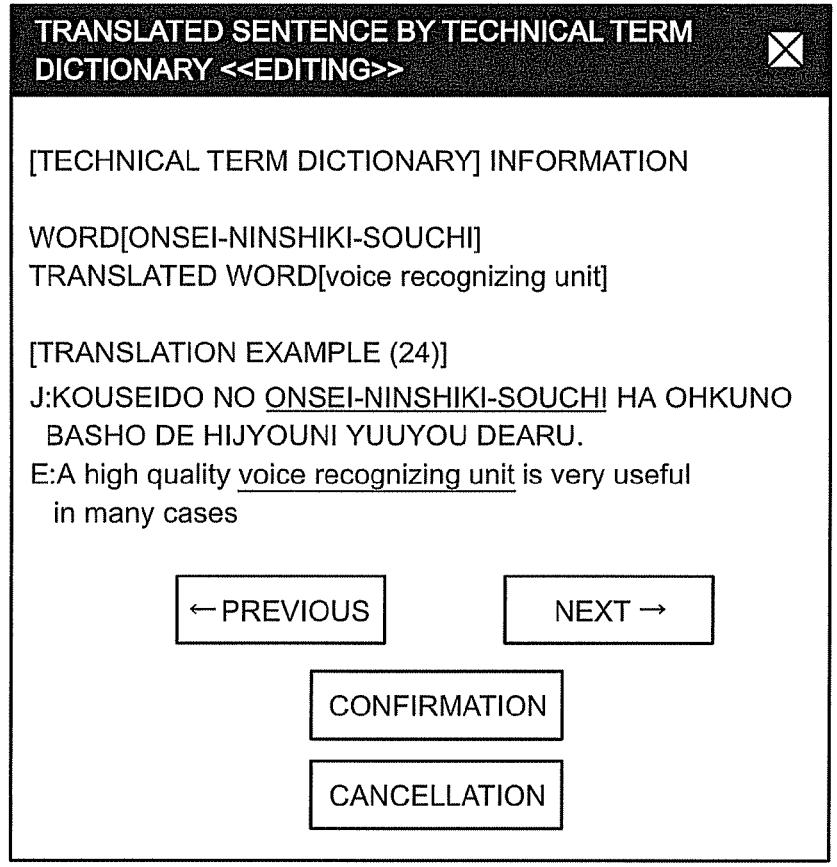
FIG. 15 is another example of an edited translated word of the technical term dictionary according to the second embodiment.

FIG. 15 is a display example of the result that the button [NEXT→] is indicated in FIG. 14. In FIG. 15, a source sentence of number 24 and a translated sentence thereof are displayed. In the same way, a translated word corresponding to the source word "ONSEI-NINSHIKI-SOUCHI" is replaced with a translated word "voice recognizing unit" (acquired from the translation memory 220). Then, when the user indicates a button [←PREVIOUS], a previous translated sentence (previously acquired by using the same translated word of the technical term dictionary 210) is displayed. In this case, the display screen is returned to FIG. 14.

Figure 16:
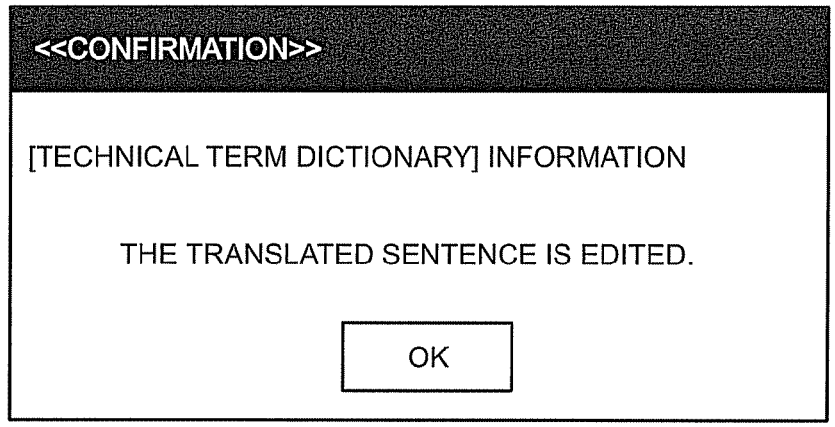
FIG. 16 is one example to confirm the edited translated word according to the second embodiment.

When a button [CONFIRMATION] is indicated on a display screen of FIG. 14 or FIG. 15, the translated sentence is edited. Then, a screen to confirm the translated sentence edited is displayed as shown in FIG. 16, and returned to the original one of FIG. 10. In this case, the software for editing is designed to perform batch editing by the button [CONFIRMATION]. Furthermore, when a button [CANCELLATION] is indicated on the display screen of FIG. 14 or FIG. 15, editing of the translated sentence is cancelled, and the screen is returned to the original one of FIG. 10.

Figure 17:
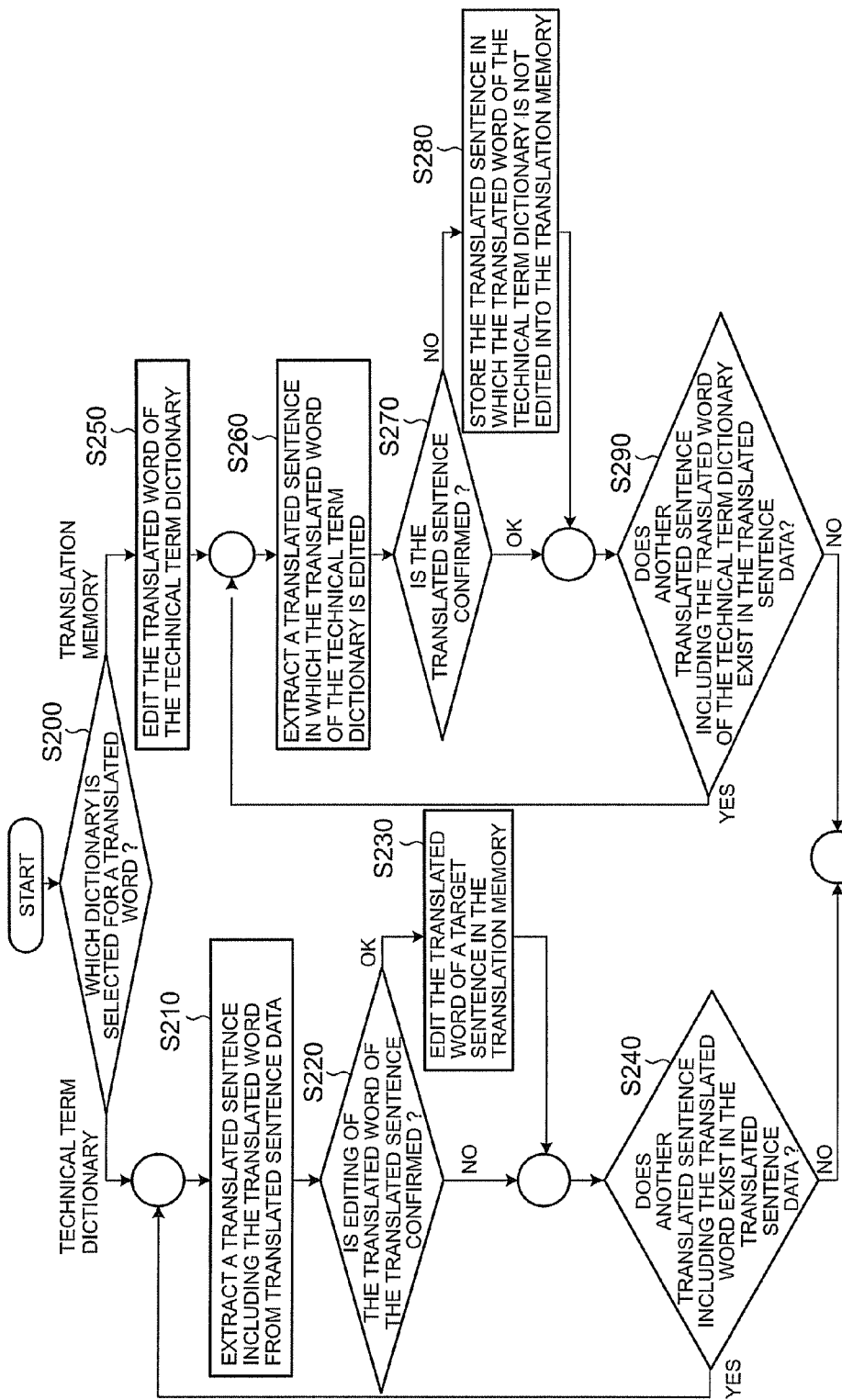
FIG. 17 is a flow chart of processing of the machine translation apparatus according to the second embodiment.

FIG. 17 is a flow chart of another editing processing after selecting the dictionary according to the second embodiment. As mentioned-above, in case of selecting any dictionary based on detection of the unmatched translation pair in FIG. 10, when a user selects the technical term dictionary 210, a translated word of a target sentence stored in the translation memory 220 is edited as shown in FIGS. 11 and 12. Furthermore, when the user selects the translation memory 220, a translated word stored in the technical term dictionary 210 is edited as shown in FIGS. 14 and 15. In FIG. 17, in case of selecting a translated word to be used for each translated sentence, processing thereof is shown.

First, based on detection of the unmatched translation pair, the user selects which dictionary (the technical term dictionary 210 or the translation memory 220) is used for generating a translated word on an operation screen of FIG. 10 (S200). When the user selects the technical term dictionary 210, the processing is forwarded to S210. Furthermore, when the user selects the translation memory 220, the processing is forwarded to S250.

When the user selects the technical term dictionary 210, one translated sentence including a translated word to be edited is extracted from translated sentence data (stored in the source/translated sentence data 400) based on the unmatched translation pair. Here, the one translated sentence was generated by using a target sentence stored in the translation memory 220. Then, the one translated sentence in which the translated word is edited is displayed as shown in FIG. 11 (S210). By deciding the display content, the user indicates a button [CONFIRMATION] or a button [CANCELLATION] on the screen of FIG. 11 (S220). When the button [CONFIRMATION] is indicated, the translated word of the target sentence stored in the translation memory 220 is edited (S230). On the other hand, when the button [CANCELLATION] is indicated, the translated word of the target sentence stored in the translation memory 220 is not edited. Next, it is decided whether another translated sentence including the same translated word to be edited exists in the translated sentence data based on the unmatched translation pair (S240). If another translated sentence exists, processing is returned to S210, and the same editing processing is repeatedly executed. If another translated sentence does not exist, processing is completed.

When the user selects the translation memory 220, a translated word to be edited is extracted from the technical term dictionary 210. Then, the translated word is edited to be same as a translated word (corresponding to a source word of the translated word to be edited) stored in the translation memory 220, and the translated word edited is stored into the technical term dictionary 210 (S250). Next, one translated sentence including the translated word to be edited is extracted from the translated sentence data based on the unmatched translation pair, and the one translated sentence in which the translated word is edited is displayed as shown in FIG. 14 (S260). By deciding the display content, the user indicates a button [CONFIRMATION] or a button [CANCELLATION] on the screen of FIG. 14 (S270). When the button [CONFIRMATION] is indicated, processing is forwarded to S290. On the other hand, when the button [CANCELLATION] is indicated, a pair of the translated sentence including the translated word not edited and a source sentence thereof is registered into the translation memory 220 (S280). Next, it is decided whether another translated sentence including the same translated word to be edited exists in the translated sentence data based on the unmatched translation pair (S290). If another translated sentence exists, processing is returned to S250, and the same editing processing is repeatedly executed. If another translated sentence does not exist, processing is completed.

In this way, by selecting a translated word for each translated sentence one by one, the translated word can be applied to the translated sentence. Furthermore, when a translated word of the translation memory 220 is selected, by editing a translated word corresponding to the same source word in the technical term dictionary 210, batch editing of the translated word can be executed. Accordingly, the translated word can be easily edited. Furthermore, by operating a button [CANCELLATION], a pair of a translated sentence including the translated word not edited and a source sentence thereof can be registered into the translation memory 220.

The Third Embodiment

The third embodiment is the second embodiment of which a part is changed. In the second embodiment, the source/translated sentence data 400 for unmatch check/editing is prepared. On the other hand, in the third embodiment, the translated sentence data 300 is prepared. Furthermore, in the third embodiment, based on a selection result of the unmatched word selection unit 410 in FIG. 8, retranslation processing is executed.

When a user selects the technical term dictionary 210 in a data selection screen of FIG. 10, usage of the translation memory 220 is suppressed. Then, in a process of retranslation, by referring to the unmatched translation pair, as to a word "ONSEI-NINSHIKI-SOUCHI" in all documents, a translated word/phrase "speech recognition equipment" stored in the technical term dictionary 210 is used for translation. Briefly, a word "voice recognizing unit" stored in the translation memory 220 is not used.

On the other hand, When a user selects the translation memory 220 in a data selection screen of FIG. 10, usage of the technical term dictionary 210 is suppressed. Then, in a process of retranslation, by referring to the unmatched translation pair, as to a word "ONSEI-NINSHIKI-SOUCHI" in all documents, a translated word/phrase "voice recognizing unit" stored in the translation memory 220 is used for translation. Briefly, a word/phrase "speech recognition equipment" stored in the technical term dictionary 210 is not used.

The Fourth Embodiment

The fourth embodiment is the second embodiment of which a part is changed. In the second embodiment, in order to edit the unmatched translation pair, source/translated sentence data is stored in the source/translated sentence data 400. On the other hand, in the fourth embodiment, the source/translated sentence data 400 is not necessary. However, based on a selection result of the unmatched word selection unit 410 in FIG. 8, a translated word or a translated sentence stored in the technical term dictionary 210 or the translation memory 220 is edited, and retranslation is executed.

Figure 18:
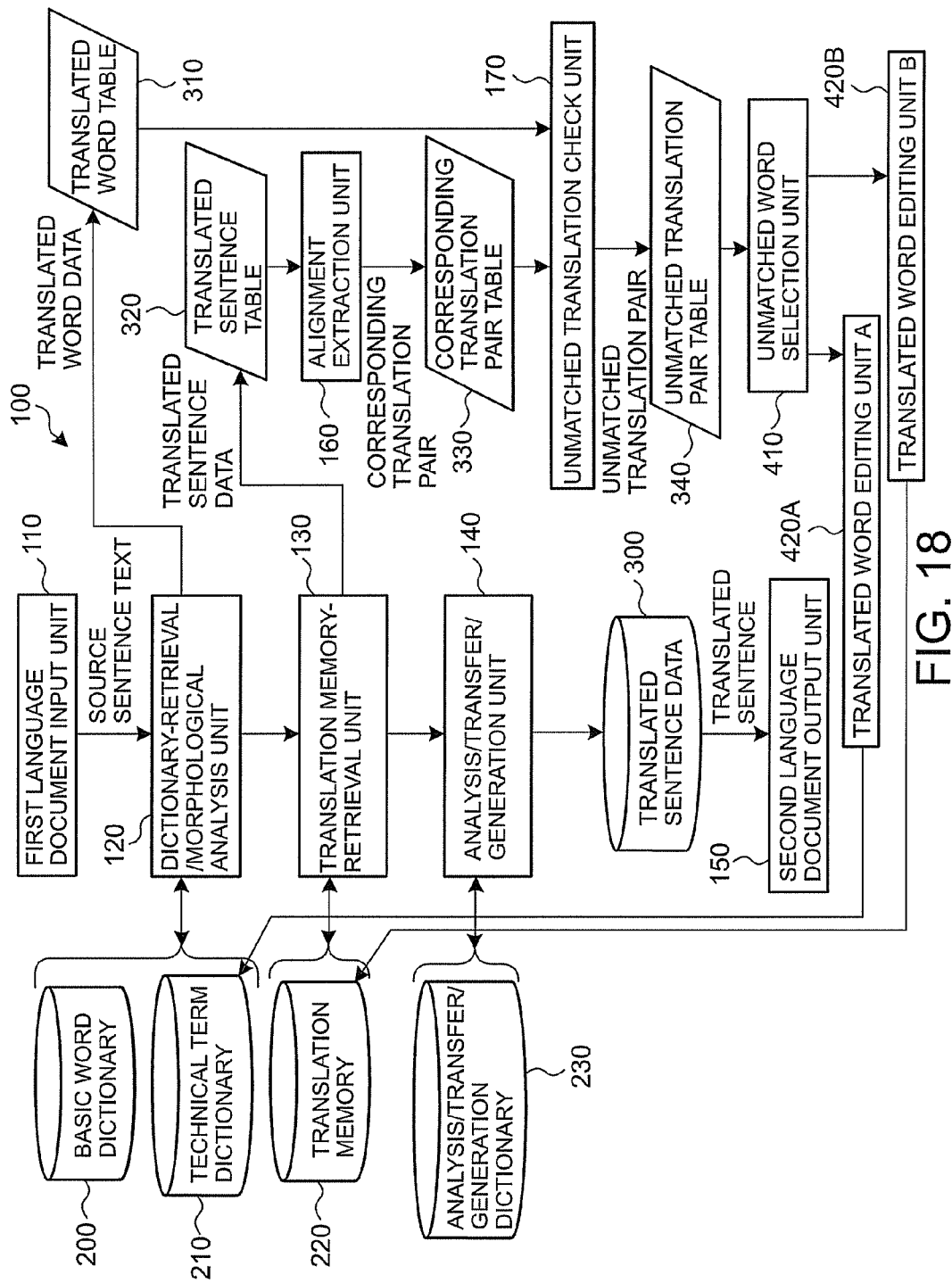
FIG. 18 is a block diagram of the machine translation apparatus according to a fourth embodiment.

FIG. 18 is a block diagram of a machine translation apparatus according to the fourth embodiment. As a part different from FIG. 8, the translated word editing unit 420 is divided into two units, i.e., a translated word editing unit (A) 420A and a translated word editing unit (B) 420B are prepared. Furthermore, the translated sentence data 300 is same component of FIG. 1. The translated word editing unit 420A edits a translated word stored in the technical term dictionary 210, and the translated word editing unit 420B edits a target sentence stored in the translation memory 220.

Briefly, when the translation memory 220 is selected by the unmatched word selection unit 410 after detecting an unmatched translation pair, the translated word selection unit 420A edits a translated word stored in the technical term dictionary 210 by referring to the unmatched translation pair. On the other hand, when the technical term dictionary 210 is selected by the unmatched word selection unit 410, the translated word selection unit 420B edits a target sentence stored in the translation memory 220 by referring to the unmatched translation pair.

Then, after content of the technical term dictionary 210 or the translation memory 220 is edited, a source sentence text of the first language is input again. By processing of the dictionary-retrieval/morphological analysis unit 120, the translation memory-retrieval unit 130 and the analysis/transfer/generation unit 140, new translated sentences are output.

FIG. 19 shows a source sentence and a translated sentence thereof edited by translated word selection unit 420B. When the technical term dictionary 210 is selected by the unmatched word selection unit 410, by referring to the unmatched translation pair before retranslation, all translated words (acquired from the translation memory 220) corresponding to a source word "ONSEI-NINSHIKI-SOUCHI" are edited to "speech recognition equipment".

FIG. 20 shows a source word and a translated word thereof edited by translated word selection unit 420A. When the translation memory 220 is selected by the unmatched word selection unit 410, by referring to the unmatched translation pair, all translated words (acquired from the technical term dictionary 210) corresponding to a source word "ONSEI-NINSHIKI-SOUCHI" are edited to "voice recognizing unit". After executing above-mentioned editing, by executing retranslation, uniformity of all translated words can be realized.

Figure 21:
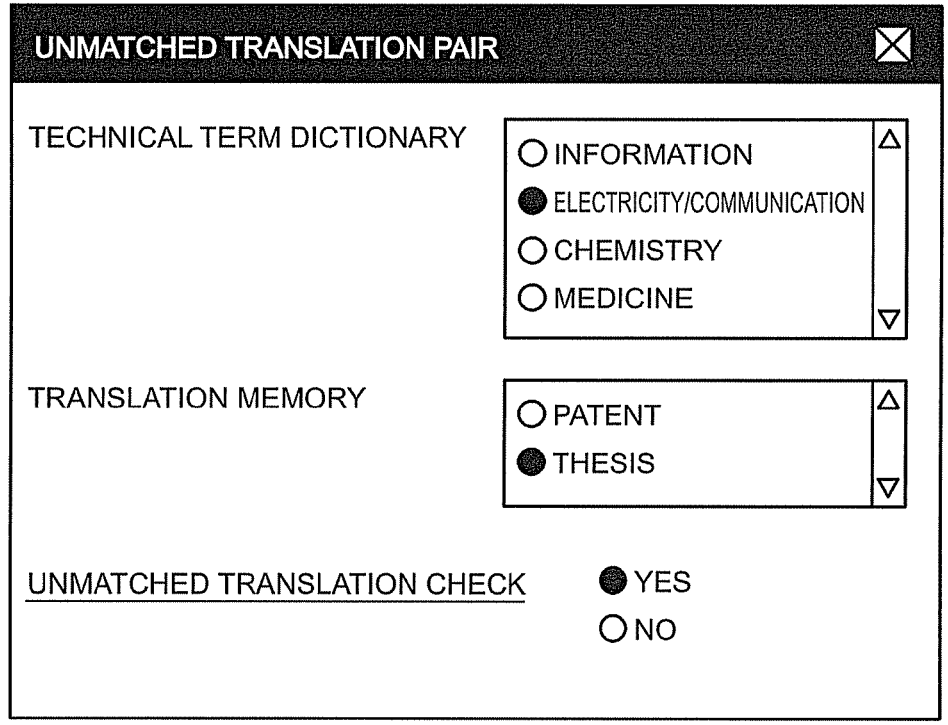
FIG. 21 is one example of a display to set the unmatched translation check.
Figure 22A:
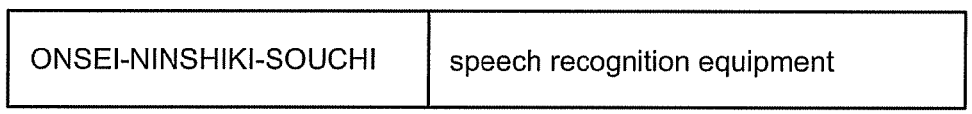
FIGS. 22A and 22B are examples of a technical term dictionary and a translation memory according to a conventional technique.
Figure 22B:
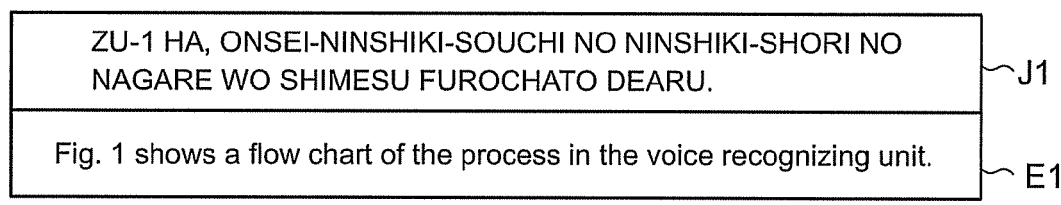

FIG. 21 shows a screen example to select whether an unmatched translation pair is checked. In this case, when "YES" is selected, the unmatched translation pair is checked. On the other hand, when "NO" is selected, the unmatched translation pair is not checked.

As mentioned-above, in the first, second, third and fourth embodiments, when the technical term dictionary and the translation memory are used together for translation, uniformity of translated words in all documents is not lost, and translation processing is correctly executed by unifying the translated words. As a result, a user's operation to edit translated words can be reduced.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory, device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from the spirit of the inventions. The accompanying claims and their equivalents are intended to cover such forms or modifications as would fall within the scope and spirit of the inventions.

What is claimed is:

1. A machine translation apparatus comprising:
    a technical term dictionary configured to store terms of a first language and translated terms of a second language respectively corresponding to the terms;
    a translation memory configured to store source sentences of the first language and target sentences of the second language respectively corresponding the source sentences;
    a translation unit configured to translate an input text of the first language into an output text of the second language by comparing each word in each sentence of the input text with the technical term dictionary and by comparing the each sentence of the input text with the translation memory;
    a corresponding translation pair extraction unit configured to extract, from a source sentence, of the source sentences, matched with a sentence of the input text and a target sentence, of the target sentences, corresponding to the source sentence stored in the translation memory, a corresponding translation pair comprising a word in the source sentence and a translated word corresponding to the word in the target sentence;
    an unmatch check unit configured to determine whether the translated word does not match a translated term corresponding to a term matched with the word in the output text, and, in response to a determination that the translated word does not match the translated term, store the translated word and the translated term as an unmatched translation pair; and
    a selection unit configured to select, in response to the determination that the translated word does not match the translated term, one of the translated word or the translated term,
    wherein the translation unit is further configured to suppress usage of the technical term dictionary or the translation memory which does not store the one, and retranslate the input text using the technical term dictionary or the translation memory which stores the one.

2. The machine translation apparatus according to claim 1, further comprising
    an editing unit configured to uniformly edit the other of the translated word or the translated term using the one.

3. The machine translation apparatus according to claim 1, further comprising:
    an editing unit configured to edit the other of the translated word of the target sentence stored in the translation memory or the translated term stored in the technical term dictionary using the one;
    wherein the translation unit is further configured to retranslate the input text using the translation memory or the technical term dictionary in which the other is edited.

4. A non-transitory computer readable medium for causing a computer to perform a method for translating an input text of a first language into an output text of a second language by comparing each word in each sentence of the input text with a technical term dictionary and by comparing the each sentence of the input text with a translation memory, wherein the technical term dictionary stores terms of the first language and respective translated terms of the second language corresponding to each of the terms, and the translation memory stores source sentences of the first language and respective target sentences of the second language corresponding to each of the source sentences, the method comprising:
    extracting, from a source sentence, of the source sentences, matched with a sentence of the input text and a target sentence, of the target sentences, corresponding to the source sentence stored in the translation memory, a corresponding translation pair comprising a word in the source sentence and a translated word corresponding to the word in the target sentence;
    determining whether the translated word does not match a translated term corresponding to a term matched with the word in the output text; and
    in response to a determination that the translated word does not match the translated term:
        storing the translated word and the translated term as an unmatched translation pair;
        selecting one of the translated word or the translated term;
        suppressing usage of the technical term dictionary or the translation memory which does not store the one; and
        retranslating the input text using the technical term dictionary or the translation memory which stores the one.

5. The non-transitory computer readable medium according to claim 4, the method further comprising
    uniformly editing the other of the translated word or the translated term using the one.

* * * * *